US012647671B2

(12) United States Patent
Hung et al.

(10) Patent No.:  US 12,647,671 B2
(45) Date of Patent:         Jun. 2, 2026

(54) PORTABLE ELECTRONIC DEVICE AND USER INTERFACE OPERATION METHOD THEREOF

(71) Applicant: Getac Technology Corporation, New Taipei (TW)

(72) Inventors: Yen-Hsiang Hung, Taipei (TW); Hung-Xin Chen, Taipei (TW)

(73) Assignee: Getac Technology Corporation, New Taipei (TW)

( * ) Notice: Subject to any disclaimer, the term of this patent is extended or adjusted under 35 U.S.C. 154(b) by 243 days.

(21) Appl. No.: 18/426,475

(22) Filed: Jan. 30, 2024

(65) Prior Publication Data

US 2024/0298085 A1      Sep. 5, 2024

Related U.S. Application Data

(60) Provisional application No. 63/449,272, filed on Mar. 1, 2023.

(30) Foreign Application Priority Data

Nov. 7, 2023    (CN) .......................... 202311473172.6

(51) Int. Cl.
*H04N 23/62*          (2023.01)
*H04N 23/53*          (2023.01)
(52) U.S. Cl.
CPC .............. *H04N 23/62* (2023.01); *H04N 23/53* (2023.01)
(58) Field of Classification Search
CPC ........ H04N 23/62; H04N 23/60; H04N 23/63; H04N 23/53; G06F 3/0362; G06F 3/0482; G06F 1/1626
See application file for complete search history.

(56) References Cited

U.S. PATENT DOCUMENTS

| 10,133,475 B2 | 11/2018 | Chaudhri |
| 2009/0280868 A1 | 11/2009 | Hawkins et al. |
| (Continued) | | |

FOREIGN PATENT DOCUMENTS

| CN | 104170396 A | 11/2014 |
| CN | 105045473 A | 11/2015 |
| (Continued) | | |

OTHER PUBLICATIONS

European Patent Office, "Search Report", Jun. 27, 2024, Germany.
Taiwan Patent Office, "Office Action", Apr. 23, 2024.

*Primary Examiner* — Kelly L Jerabek
(74) *Attorney, Agent, or Firm* — Troutman Pepper Locke LLP; Tim Tingkang Xia, Esq.

(57) ABSTRACT

A portable electronic device includes a wheel, a display and a processor. The wheel is configured to rotate to generate a positive/negative switching signal. The display is configured to display a current option, which is one of a plurality of first/second function options. The processor is electrically connected to the wheel and the display, and is configured to switch the current option to last/first one of the plurality of first/second function options when receiving the negative/positive switching signal and determining that the current option is first/last one of the plurality of first function options; and not to switch the current option when receiving the negative switching signal and determining that the current option is first one of the plurality of second function options, or when receiving the positive switching signal and determining that the current option is last one of the plurality of second function options.

21 Claims, 7 Drawing Sheets

(56)                References Cited

U.S. PATENT DOCUMENTS

2009/0307633  A1     12/2009  Haughay, Jr. et al.
2010/0271341  A1 *   10/2010  Nagashima ........... G06F 3/0482
                                                                    345/184
2013/0162689  A1 *    6/2013  Fujitani ................... G09G 5/34
                                                                    345/682
2017/0104922  A1 *    4/2017  Matsushima  .......... H04N 23/62
2021/0127054  A1 *    4/2021  Fujii  ...................... H04N 23/62

FOREIGN PATENT DOCUMENTS

CN          107291341  A     10/2017
CN          110913615  B      7/2021
EP            2251775  A1    11/2010
TW          200836087  A      9/2008
TW          200840339  A     10/2008
TW          201003467  A      1/2010

* cited by examiner

<u>1</u>

A1     A2     —121

(2/6) | User

Adeel Muhammad —A3

PORTABLE ELECTRONIC DEVICE AND USER INTERFACE OPERATION METHOD THEREOF

CROSS-REFERENCE TO RELATED APPLICATIONS

This non-provisional application claims priority under 35 U.S.C. § 119(a) on U.S. Provisional Patent Application No. 63/449,272 filed in America on Mar. 1, 2023 and Patent Application No(s). 202311473172.6 filed in China on Nov. 7, 2023, the entire contents of which are hereby incorporated by reference.

BACKGROUND

1. Technical Field

This disclosure relates to a portable electronic device and user interface operation method thereof.

2. Related Art

For some portable electronic devices, in order to achieve complete functions, it may be necessary to set a large number of control keys, which complicates the operation process. On the other hand, fewer control keys may only be used to perform relatively simple functions. Therefore, how to design portable electronic devices and user interface operation methods that are highly usable and easy to interact with under limited hardware conditions will be an important issue in related fields.

SUMMARY

This disclosure provides a portable electronic device and user interface operation method thereof.

According to one or more embodiment of this disclosure, a portable electronic device includes a wheel, a display and a processor. The wheel is configured to rotate to generate a positive switching signal or a negative switching signal. The display is configured to display a current option, which is one of a plurality of first function options and a plurality of second function options. The processor is electrically connected to the wheel and the display, and is configured to switch the current option to last one of the plurality of first function options when receiving the negative switching signal and determining that the current option is first one of the plurality of first function options; to switch the current option to first one of the plurality of first function options when receiving the positive switching signal and determining that the current option is last one of the plurality of first function options; and not to switch the current option when receiving the negative switching signal and determining that the current option is first one of the plurality of second function options, or when receiving the positive switching signal and determining that the current option is last one of the plurality of second function options.

According to one or more embodiment of this disclosure, a user interface operation method that is applicable to a portable electronic device including a wheel and a display includes: controlling the display to display a current option, wherein the current option is one of a plurality of first function options and a plurality of second function options; when receiving a negative switching signal from the wheel and determining that the current option is first one of the plurality of first function options, switching the current option to last one of the plurality of first function options; when receiving a positive switching signal from the wheel and determining that the current option is last one of the plurality of first function options, switching the current option to first one of the plurality of first function options; and when receiving the negative switching signal and determining that the current option is first one of the plurality of second function options, or when receiving the positive switching signal and determining that the current option is last one of the plurality of second function options, not switching the current option.

In view of the above description, the portable electronic device and user interface operation method thereof of the present disclosure may switch the current option among the menu with rotation operation through a design of wheel. When the processor determines that the current option belongs to the first function options, the options in the first function menu may be cyclically switched; when the processor determines that the current option belongs to the second function options, the option in the second function menu may be switched and stop at endpoint. In this way, the user of the portable electronic device of the present disclosure may use the same rotation operation to achieve different switching modes in different function menus, thereby satisfying the requirement that the portable electronic device may be equipped with a plurality of function switching operations even with of simplified control key configuration. Furthermore, various function options of the portable electronic device of the present disclosure may basically be achieved within three steps through the rotation of the wheel, which has the advantages of high usability and easy interaction.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

Figures 8, 9:
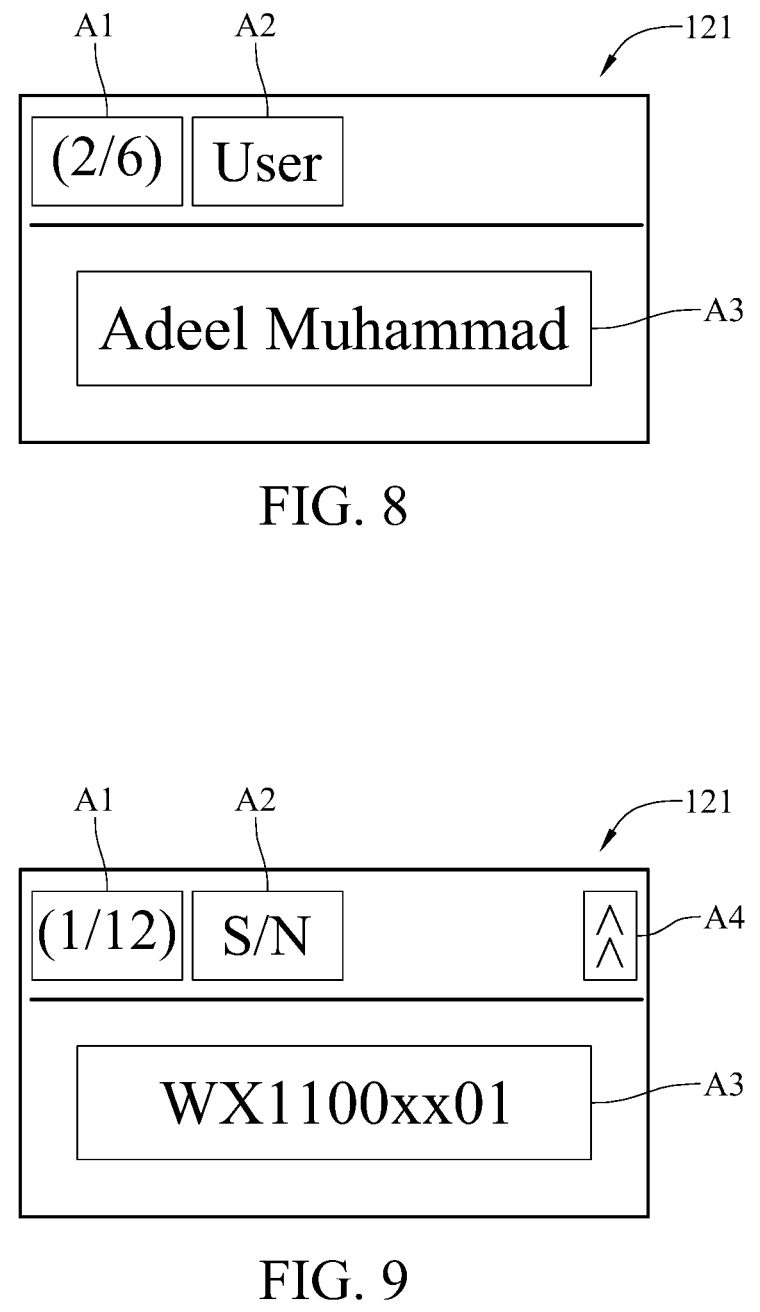

FIGS. 8 to 11 each schematically illustrates a display screen that displays different function options, of a portable electronic device according to an embodiment of the present disclosure.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
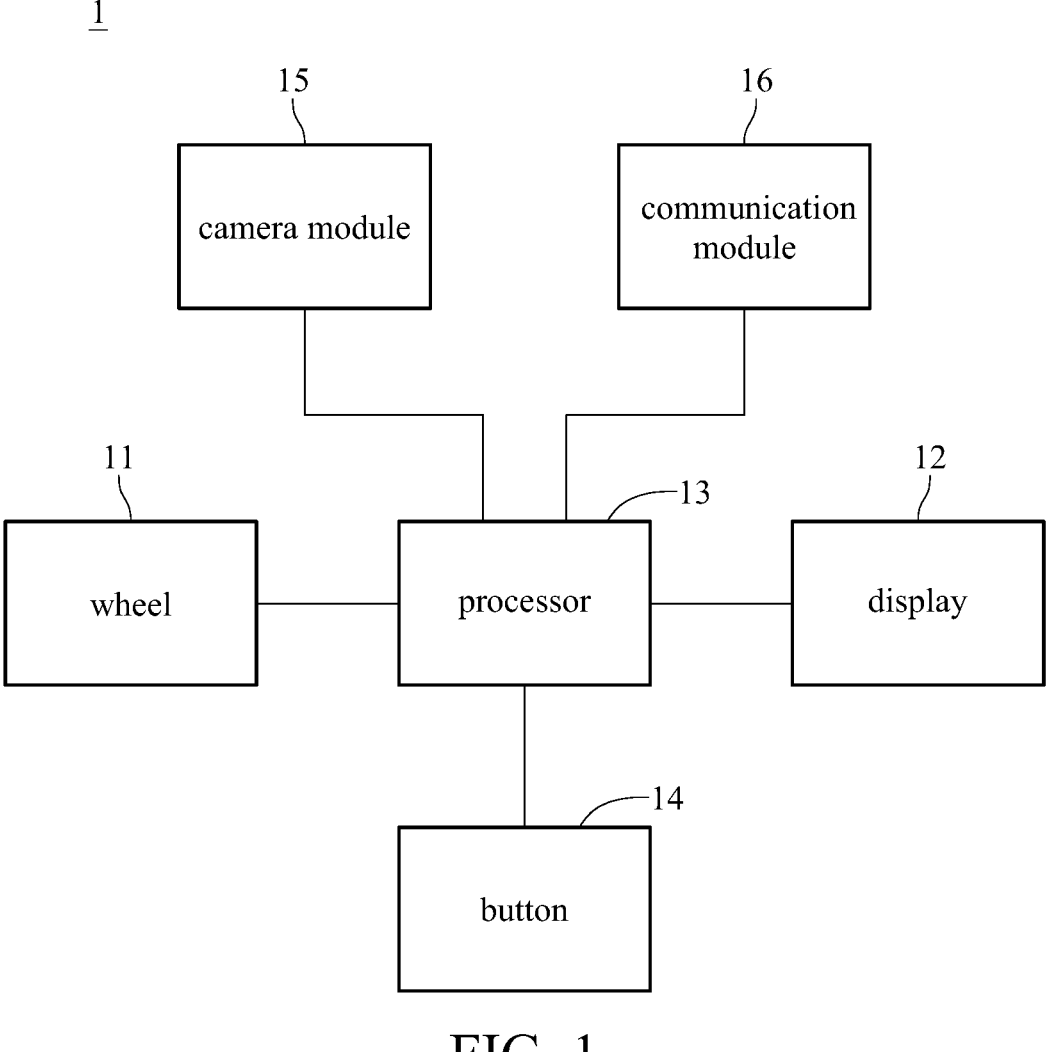
FIG. 1 is a functional block diagram of a portable electronic device according to an embodiment of the present disclosure.

Please refer to FIG. 1 which is a functional block diagram of a portable electronic device according to an embodiment of the present disclosure. As shown in FIG. 1, a portable electronic device 1 includes a wheel 11, a display 12, a processor 13, a button 14, a camera module 15 and a communication module 16. The wheel 11 is configured to rotate to generate a positive switching signal or a negative switching signal. The display 12 is configured to display a current option, which is one of a plurality of first function options and a plurality of second function options. The processor 13 is electrically connected to the wheel 11, the display 12, the button 14, the camera module 15 and the communication module 16, and is configured to switch the current option to last one of the plurality of first function options when receiving the negative switching signal and determining that the current option is first one of the plurality of first function options; to switch the current option to first one of the plurality of first function options when receiving the positive switching signal and determining that the current option is last one of the plurality of first function options; and not to switch the current option when receiving the negative switching signal and determining that the current option is first one of the plurality of second function options, or when receiving the positive switching signal and determining that the current option is last one of the plurality of second function options.

In the present embodiment, the wheel 11 is configured to rotate clockwise or counterclockwise to generate the positive switching signal or the negative switching signal accordingly. The display 12 has a display screen and is configured to display the current option. The current option belongs to the first function options or the second function options, wherein the first function options may correspond to one of a main menu or a sub-menu, and the second function options may correspond to the other of the main menu or the sub-menu. The processor 13 may be implemented through a microcontroller, a central processing unit, a programmable logic controller, etc., and is configured to perform process control based on the signals or data provided by the wheel 11, the button 14, the camera module 15 and the communication module 16. The button 14 is configured to be triggered to generate a selection signal. The camera module 15 includes a lens and an audio device (such as a microphone and a speaker), and is configured to capture image to generate a video file or an image file. The communication module 16 may include a Bluetooth communication unit for Bluetooth connection and a wireless network communication unit for wireless network connection (WiFi), etc., and is configured for data transmission and communication functions with the other devices. In addition, the portable electronic device 1 may include at least one memory, which is configured to store video files and image files captured by the camera module 15. It should be noted that the camera module 15 and the communication module 16 of the present embodiment are optional in the present disclosure. Specifically, in the following description, a wearable camera is used as an example of the portable electronic device 1, but the present disclosure is not limited thereto.

Figure 2:
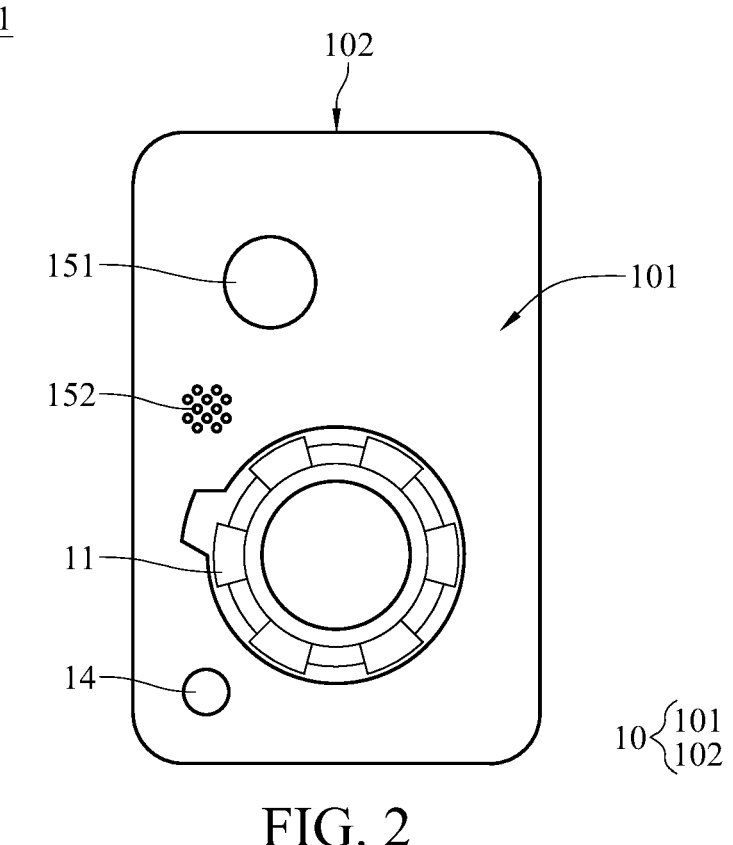
FIG. 2 is a schematic view of a portable electronic device from a first perspective according to an embodiment of the present disclosure.
Figure 3:
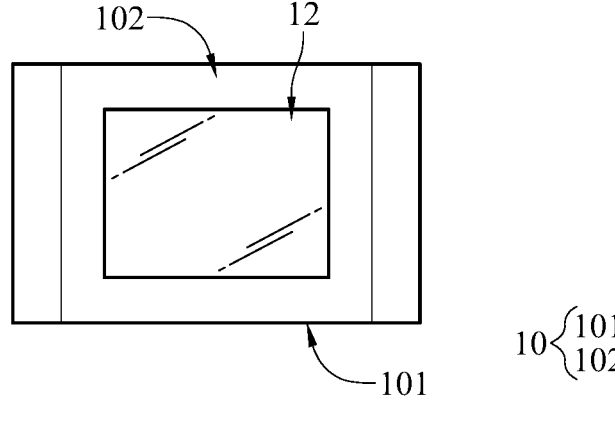
FIG. 3 is a schematic view of a portable electronic device from a second perspective according to an embodiment of the present disclosure.

Please refer to FIGS. 2 and 3 along with FIG. 1, FIG. 2 is a schematic view of a portable electronic device from a first perspective according to an embodiment of the present disclosure, and FIG. 3 is a schematic view of a portable electronic device from a second perspective according to an embodiment of the present disclosure. As shown in FIGS. 1 to 3, the lens 151 and the audio device 152 of the camera module 15 are located on a first side 101 of a casing 10 of the portable electronic device 1, and the display 12 is located on a second side 102 of the casing 10, wherein the first side 101 and the second side 102 are next to each other. In use, when the portable electronic device 1 (wearable camera) is worn, the first side 101 faces the image capturing direction, which is usually in front of the user. When the user wants to perform the operation of switching options, the wheel 11 may be rotated clockwise or counterclockwise to generate a positive switching signal or a negative switching signal respectively. During the switching process, the display screen of the display 12 may display the current option. When the user wants to click on a specific option, he/she may press the button 14 to trigger the generation of a selection signal. The above operation process is further described herein with reference to FIGS. 4 to 6.

The portable electronic device 1 of the present disclosure may be controlled using a user interface operation method. The user interface operation method includes: controlling the display to display a current option, wherein the current option is one of a plurality of first function options and a plurality of second function options; when receiving the negative switching signal and determining that the current option is first one of the plurality of first function options, switching the current option to last one of the plurality of first function options; when receiving the positive switching signal and determining that the current option is last one of the plurality of first function options, switching the current option to first one of the plurality of first function options; and when receiving the negative switching signal and determining that the current option is first one of the plurality of second function options or when receiving the positive switching signal and determining that the current option is last one of the plurality of second function options, not switching the current option.

Figure 4:
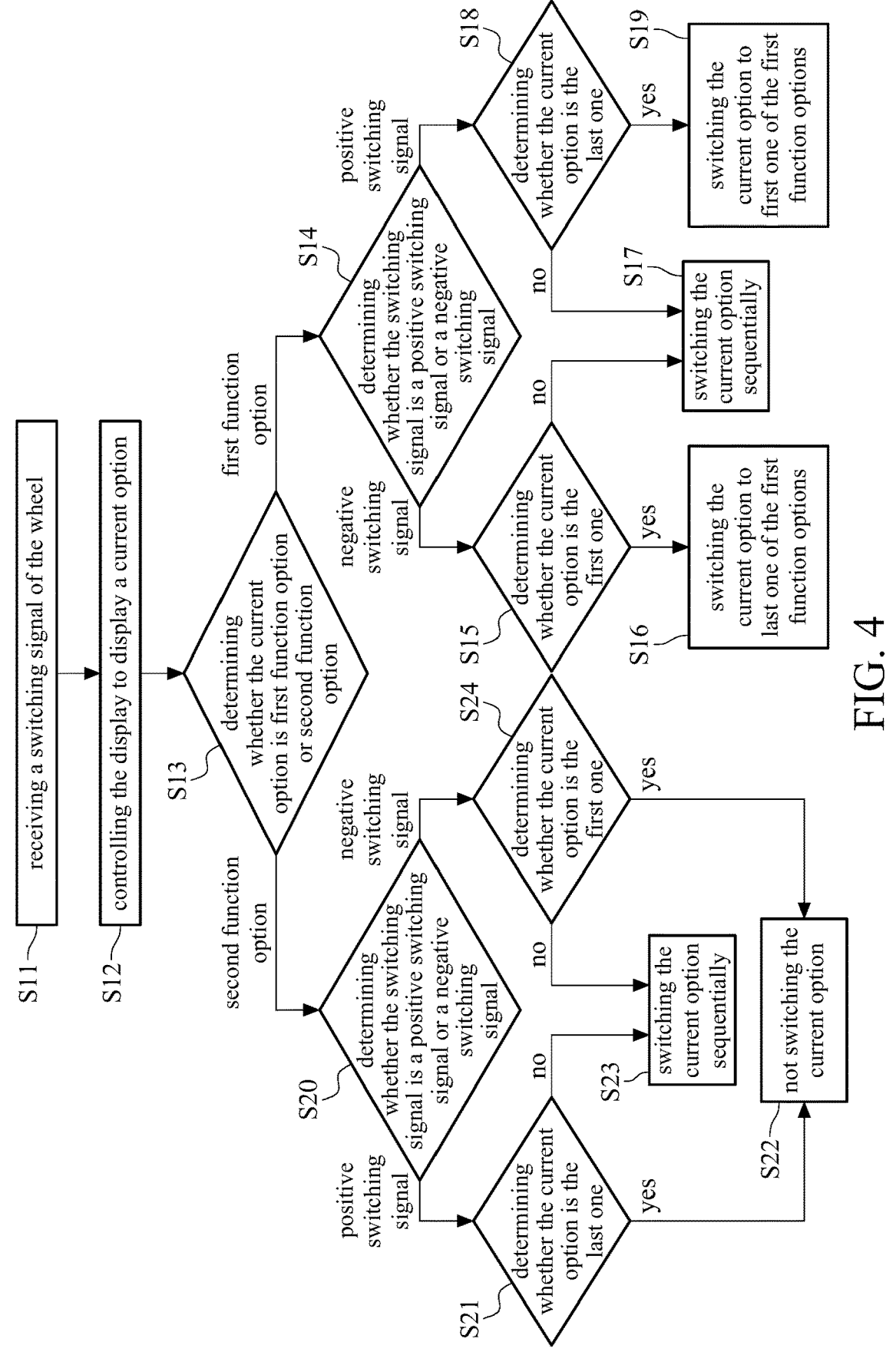
FIG. 4 is a flow chart of a user interface operation method of a portable electronic device according to an embodiment of the present disclosure.

Please refer to FIG. 4 along with FIG. 1, FIG. 4 is a flow chart of a user interface operation method of a portable electronic device according to an embodiment of the present disclosure. As shown in FIG. 4, the processor 13 of the portable electronic device 1 may execute steps S11 to S24.

In step S11, the processor 13 receives the switching signal of the wheel 11. In step S12, the processor 13 controls the display 12 to display the current option. In step S13, the processor 13 determines whether the current option is a first function option or a second function option. In particular, there is no specific sequence relationship between steps S12 and S13. For example, while the processor 13 controls the display 12 to display the current option, the processor 13 may determine whether the current option is the first or the second function option.

When the determination result in step S13 indicates the first function option, the processor 13 executes step S14: determining whether the switching signal is a positive switching signal or a negative switching signal. In the present embodiment, "clockwise direction" is relative to "counterclockwise direction"; "positive switching signal" is relative to "negative switching signal". For example, when the wheel 11 rotates in the "counterclockwise direction", the processor 13 may receive the "negative switching signal"; when the wheel 11 rotates in the "clockwise direction", the processor 13 may receive the "positive switching signal". Specifically, the positive switching signal and the negative switching signal may have different characteristic parameters (such as voltage, current, amplitude, frequency, etc.) or carry different information for the processor 13 to determine.

When the determination result of step S14 indicates a negative switching signal, the processor 13 executes step S15: determining whether the current option is the first one. If the determination result of step S15 is "yes", the processor 13 then executes step S16: switching the current option to the last one of the first function options. If the determination result of step S15 is "no", the processor 13 then executes step S17: switching the current option sequentially. In the present embodiment, "the first one" is relative to "the last one". In one implementation, when the current option is the second one of the first function options, the processor 13 may switch the current option to the first one of the first function options according to the negative switching signal (step S17). In another implementation, when the current option is the first one of the first function options, the processor 13 may switch the current option to the last one of the first function options according to the negative switching signal (step S16).

When the determination result of step S14 indicates a positive switching signal, the processor 13 executes step S18: determining whether the current option is the last one. If the determination result of step S18 is "yes", the processor 13 then executes step S19: switching the current option to the first one of the first function options. If the determination result of step S18 is "no", the processor 13 then executes step S17: switching the current option sequentially. In one implementation, when the current option is the second last of the first function options, the processor 13 may switch the current option to the last one of the first function options according to the positive switching signal (step S17). In another implementation, when the current option is the last one of the first function options, the processor 13 may switch the current option to the first one of the first function options according to the positive switching signal (step S16).

When the determination result in step S13 indicates the second function option, the processor 13 executes step S20: determining whether the switching signal is a positive switching signal or a negative switching signal. Specifically, step S20 is basically the same as step S14, and repeated description is omitted herein. When the determination result of step S20 indicates a positive switching signal, the processor 13 executes step S21: determining whether the current option is the last one. If the determination result of step S21 is "yes", the processor 13 then executes step S22: not switching the current option. If the determination result of step S21 is "no", the processor 13 then executes step S23: switching the current option sequentially. In one implementation, when the current option is the second last of the second function options, the processor 13 may switch the current option to the last one of the second function options according to the positive switching signal (step S23). In another implementation, when the current option is the last one of the second function options, the processor 13 may not switch the current option according to the positive switching signal (step S22).

When the determination result of step S20 indicates a negative switching signal, the processor 13 executes step S24: determining whether the current option is the first one. If the determination result of step S24 is "yes", the processor 13 then executes step S22: not switching the current option.

If the determination result of step S24 is "no", the processor 13 then executes step S23: switching the current option sequentially. In one implementation, when the current option is the second one of the second function options, the processor 13 may switch the current option to the first one of the second function options according to the negative switching signal (step S23). In another implementation, when the current option is the first one of the second function options, the processor 13 may not switch the current option according to the negative switching signal (step S22).

Figure 5:
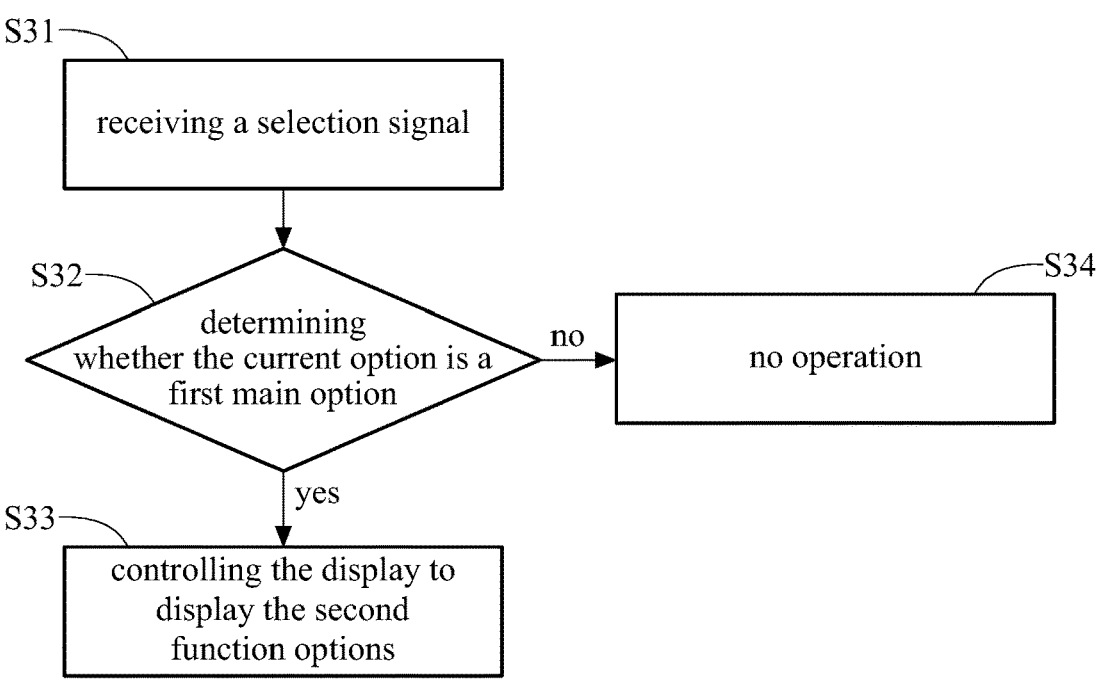
FIG. 5 is a flow chart of a user interface operation method of a portable electronic device according to another embodiment of the present disclosure.

Please refer to FIG. 5 along with FIG. 1, FIG. 5 is a flow chart of a user interface operation method of a portable electronic device according to another embodiment of the present disclosure. In the present embodiment, the processor 13 may further execute step S31: receiving a selection signal; step S32: determining whether the current option is a main option. If the determination result of step S32 is "yes", the processor 13 then executes step S33: controlling the display to display the second function options. If the determination result of step S32 is "no", no operation is executed by the processor 13, which corresponds to step S34.

In steps S31 to S33, when the processor 13 receives the selection signal from the button 14 and determines that the current option is a first main option, the processor 13 may control the display 12 to display one of the plurality of second function options, wherein the plurality of second function options belong to the first main option of the plurality of first function options. Or, when the processor 13 receives the selection signal from the button 14 and determines that the current option is a second main option, the processor 13 may control the display 12 to display one of the plurality of first function options, wherein the plurality of first function options belong to the second main option of the plurality of second function options. In the present embodiment, there is a hierarchical relationship between the first function options and the second function options. For example, the first function options belong to a main menu and the second function options belong to a sub-menu (or vice versa), and a first main option among the first function options may correspond to one of the second function options. That is, when the user switches among the first function options through the wheel 11 and selects a specific one through the button 14, the processor 13 may control the display 12 to display the second function options. In this way, the user may simply use the wheel 11 and the button 14 to read different function menus, and there may be different switching modes between different function menus.

In another embodiment, the plurality of second function options may belong to a first main option of the plurality of first function options, and the processor may further execute: controlling the display 12 to display the first main option when controlling the display 12 displaying one of the plurality of second function options and receiving the selection signal. Or, the plurality of first function options may belong to a second main option of the plurality of second function options, and the processor may further execute: controlling the display 12 to display the second main option when controlling the display 12 displaying one of the plurality of first function options and receiving the selection signal. In the present embodiment, the button 14 may be regarded as a "return button", so that when the current option is an option of a sub-menu, the processor 13 may control the display 12 to display one of the options of the main menu based on the selection signal generated by triggering the button 14.

Figure 6:
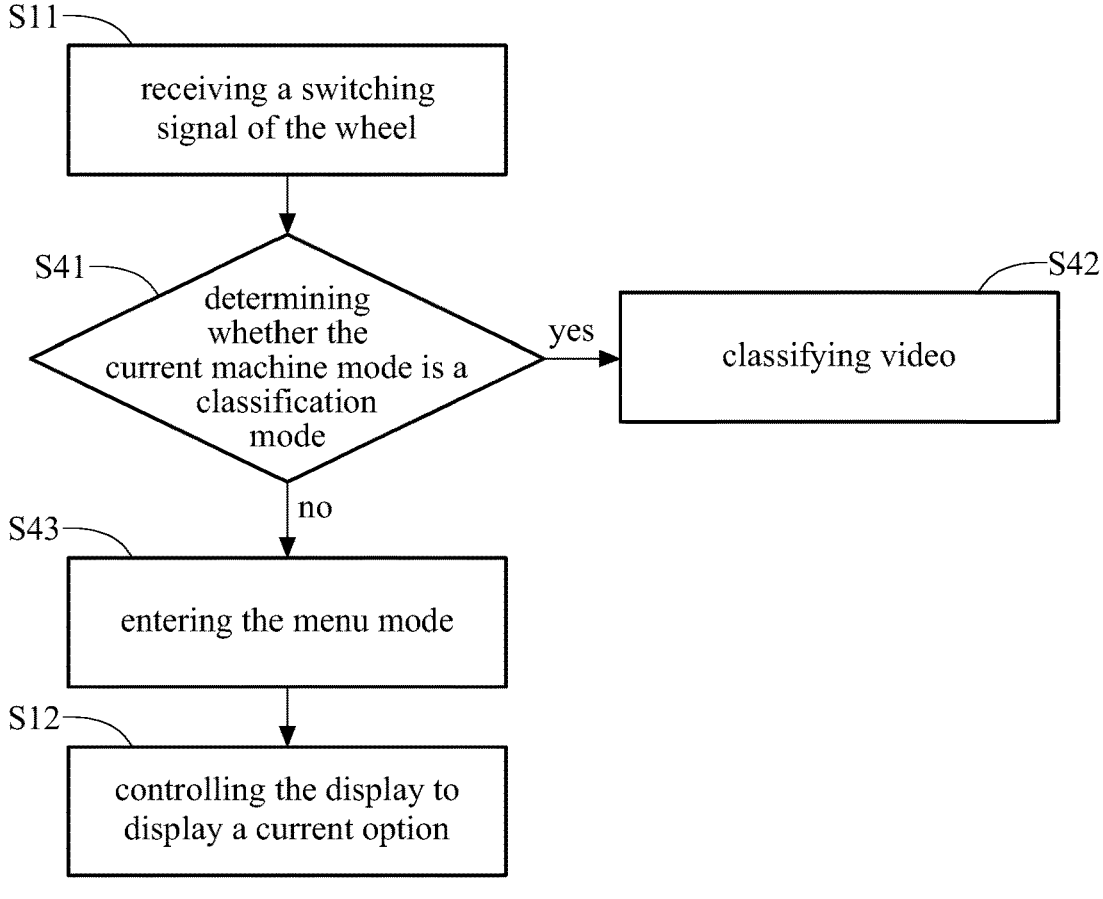
FIG. 6 is a flow chart of a user interface operation method of a portable electronic device according to still another embodiment of the present disclosure.

Please refer to FIG. 6 along with FIGS. 1 and 4, FIG. 6 is a flow chart of a user interface operation method of a portable electronic device according to still another embodiment of the present disclosure. In the present embodiment, the user interface operation method may further include, between step S11 of receiving the switching signal of the wheel and step S12 of controlling the display to display a current option, step S41: determining whether a current machine mode is a classification mode. If the determination result of step S41 is "yes", the processor executes step S42. If the determination result of step S41 is "no", the processor executes step S43: entering a menu mode. Specifically, the portable electronic device 1 (wearable camera) in the present embodiment may have three modes, which are image capturing mode, menu mode and classification mode. When the portable electronic device 1 is in the menu mode, the processor 13 does not need to execute steps S31 to S33 when receiving the switching signal of the wheel 11; when the portable electronic device 1 is in the image capturing mode, the processor 13 may determine in step S41 that the machine mode is not the classification mode when receiving the switching signal of the wheel 11, and control the display 12 to display a menu (enter the menu mode) in step S43; when the portable electronic device 1 is in the classification mode, the processor 13 may determine that the machine mode is the classification mode in step S41 when receiving the switching signal of the wheel 11, and classify the videos in step S42. In addition, the portable electronic device 1 may have other modes, such as pre-buffer mode, privacy mode, unregistered mode, etc., which is not described in detail herein.

Figure 7:
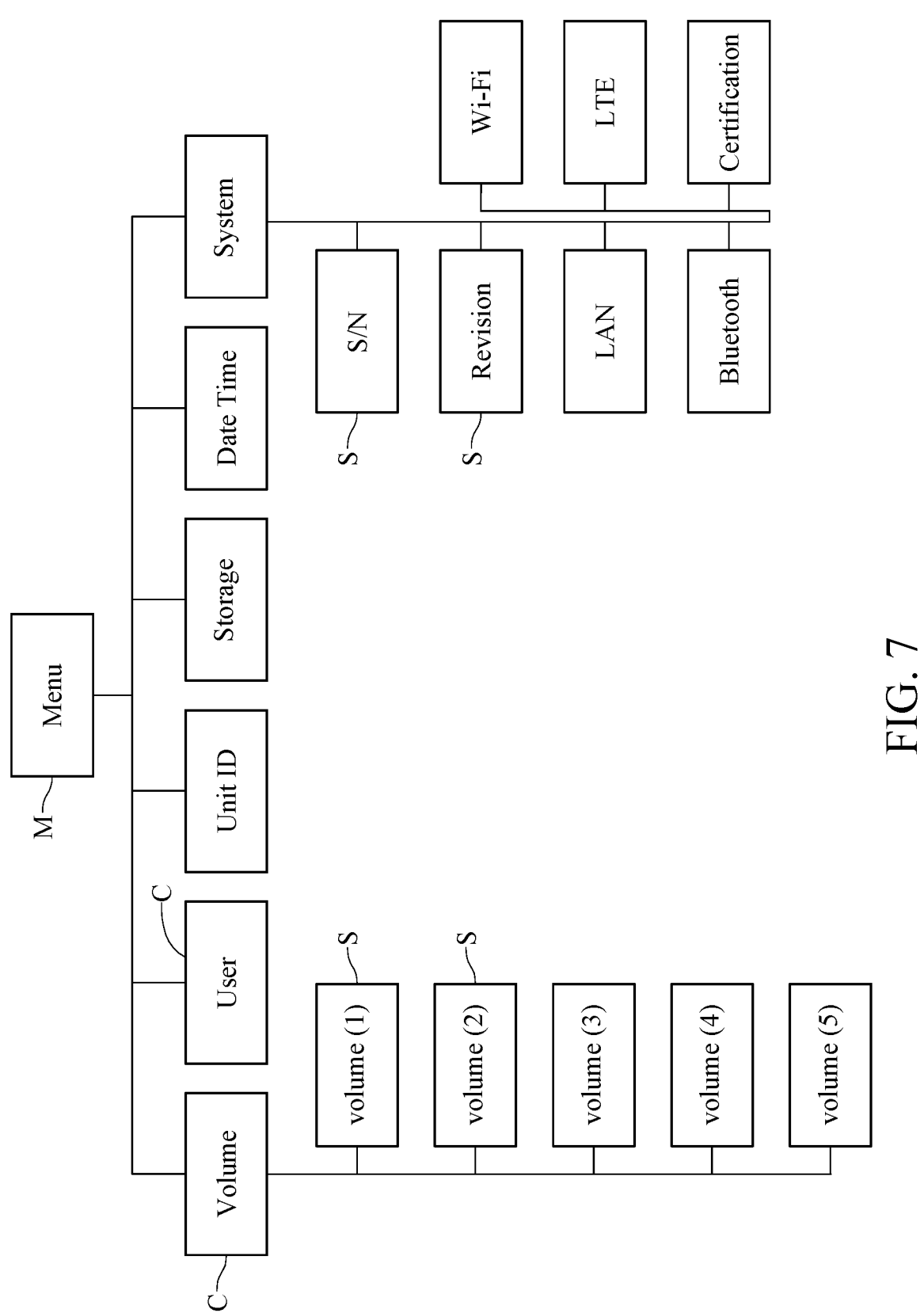
FIG. 7 schematically illustrates a structure of the first function options and the second function options of the portable electronic device according to an embodiment of the present disclosure.
Figure 10:
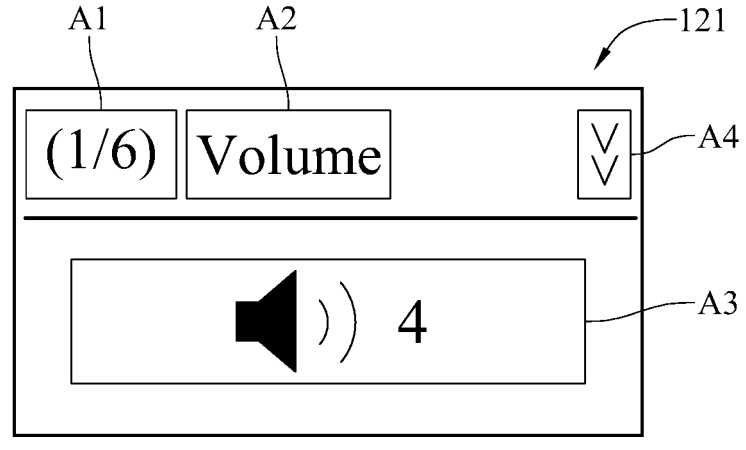
Figure 11:
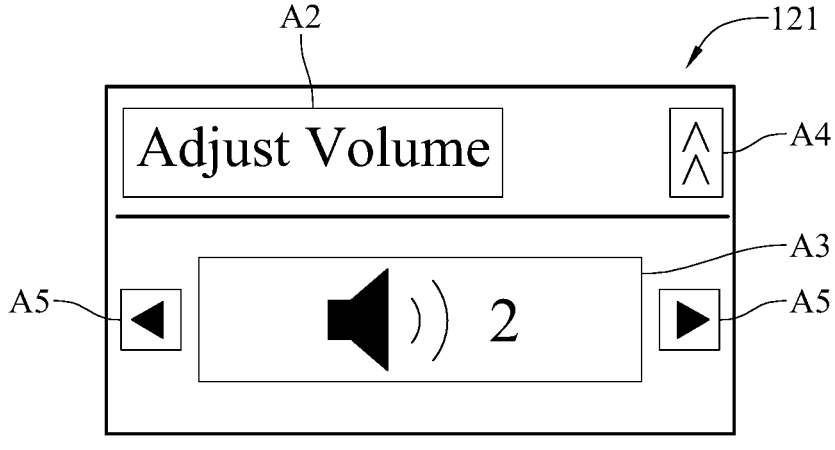

Please refer to FIG. 7 which schematically illustrates a structure of the first function options and the second function options of the portable electronic device according to an embodiment of the present disclosure. As shown in FIG. 7, there are multiple main menu options C under the menu M, including volume option, user option, unit ID option, storage option, date and time option, and system option. For some specific main menu options C, it may correspond to at least one sub-menu option S. For example, the volume option may correspond to the sub-menu options S from volume (1) to volume (5), and the system option may correspond to the sub-menu options S of the serial number (S/N), firmware version information (Revision), local area network (LAN), Bluetooth, wireless network (WiFi), long term evolution (LTE) and certification information.

In the present embodiment, the first function options described above are the main menu options C, and the second function options described above are the sub-menu options S. That is, the second function options that are switched and stop at endpoint may correspond to the volume levels from volume (1) to volume (5), and the first one and the last one of the plurality of volume levels correspond to the two volume extreme values respectively. For the system option, the second function options include serial number option, firmware version information option, LAN option, Bluetooth option, wireless network option, long-term evolution technology option, and certification information option. Please refer to FIG. 7 along with FIG. 1. In the present embodiment, when the processor 13 receives a selection signal of the button 14 and determines that the current option is LAN option, Bluetooth option, wireless network option or long-term evolution technology option, the processor 13 may control the communication module 16 to execute corresponding connection and communication functions.

Please refer to FIGS. 8 to 11, FIGS. 8 to 11 each schematically illustrates a display screen that displays different function options, of a portable electronic device according to an embodiment of the present disclosure. As shown in FIGS. 8 to 11, the plurality of display areas A1, A2, A3, A4 and A5 of the display screen 121 of the display are controlled by the processor described above to display different option information. Please refer to FIG. 8, display area A1 displays the current option as the second one of the six options (first function options) of the main menu, display area A2 displays the name of the current option as the user option, and display area A3 displays the content information of the current option. Please refer to FIG. 9, display area A1 displays the current option as the first one of the twelve options (second function options) of the sub-menu, display area A2 displays the name of the current option as the serial number option, display area A3 displays the content information of the current option, and display area A4 displays that there is an upper-level menu (main menu) above the menu of the current option. Please refer to FIG. 10, display area A1 displays the current option as the first one of the six options (first function options) of the main menu, display area A2 displays the name of the current option as the volume option, display area A3 displays the content information of the current option, that is, the current volume, and display area A4 displays that there is a lower-level menu (sub-menu) below the menu of the current option. Please refer to FIG. 11, display area A2 displays the name of the current option as the volume option, display area A3 displays the content information of the current option, display area A4 displays that there is an upper-level menu (main menu) above the menu of the current option, and display areas A5 display the adjustment of turning up and turning down of the current option, in which the positive switching signal described above may correspond to the arrow pointing rightward, and the negative switching signal described above may correspond to the arrow pointing leftward.

In view of the above description, the portable electronic device and user interface operation method thereof of the present disclosure may switch the current option among the menu with rotation operation through a design of wheel. When the processor determines that the current option belongs to the first function options, the options in the first function menu may be cyclically switched; when the processor determines that the current option belongs to the second function options, the option in the second function menu may be switched and stop at endpoint. In this way, the user of the portable electronic device of the present disclosure may use the same rotation operation to achieve different switching modes in different function menus, thereby satisfying the requirement that the portable electronic device may be equipped with a plurality of function switching operations even with simplified control key configuration. Furthermore, various function options of the portable electronic device of the present disclosure may basically be achieved within three steps through the rotation of the wheel, which has the advantages of high usability and easy interaction.

What is claimed is:

1. A portable electronic device, comprising:
   a wheel configured to rotate to generate a positive switching signal or a negative switching signal;
   a display configured to display a current option, wherein the current option is one of a plurality of first function options and a plurality of second function options; and
   a processor electrically connected to the wheel and the display, and configured to:
   determine whether the current option belongs to the plurality of first function options or the plurality of second function options, wherein the plurality of first function options correspond to a cycle switching mode, and the plurality of second function options correspond to an endpoint switching mode;

switch the current option to last one of the plurality of first function options when receiving the negative switching signal and determining that the current option is first one of the plurality of first function options;

switch the current option to the first one of the plurality of first function options when receiving the positive switching signal and determining that the current option is the last one of the plurality of first function options; and not switch the current option when receiving the negative switching signal and determining that the current option is first one of the plurality of second function options, or when receiving the positive switching signal and determining that the current option is last one of the plurality of second function options.

2. The portable electronic device of claim 1, further comprising:

a button connected to the processor, and configured to be triggered to generate a selection signal, wherein the plurality of second function options belong to a first main option of the plurality of first function options, and the processor is further configured to control the display to display one of the plurality of second function options when receiving the selection signal and determining that the current option is the first main option; or wherein the plurality of first function options belong to a second main option of the plurality of second function options, and the processor is further configured to control the display to display one of the plurality of first function options when receiving the selection signal and determining that the current option is the second main option.

3. The portable electronic device of claim 1, further comprising:

a button connected to the processor, and configured to be triggered to generate a selection signal, wherein the plurality of second function options belong to a first main option of the plurality of first function options, and the processor is further configured to control the display to display the first main option when controlling the display displaying one of the plurality of second function options and receiving the selection signal; or wherein the plurality of first function options belong to a second main option of the plurality of second function options, and the processor is further configured to control the display to display the second main option when controlling the display displaying one of the plurality of first function options and receiving the selection signal.

4. The portable electronic device of claim 1, wherein the processor is further configured to:

switch the current option sequentially when receiving the negative switching signal and determining that the current option is one of the plurality of first function options except the first one of the plurality of first function options, or when receiving the positive switching signal and determining that the current option is one of the plurality of first function options except the last one of the plurality of first function options; and switch the current option sequentially when receiving the negative switching signal and determining that the current option is one of the plurality of second function options except the first one of the plurality of second function options, or when receiving the positive switching signal and determining that the current option is one of the plurality of second function options except the last one of the plurality of second function options.

5. The portable electronic device of claim 1, wherein the plurality of second function options correspond to a plurality of volume levels, and the first one of the plurality of volume levels and the last one of the plurality of volume levels correspond to two volume extreme values respectively.

6. The portable electronic device of claim 1, wherein the plurality of second function options comprise at least two of a serial number option, a firmware version information option, a local area network option, a Bluetooth option, a wireless network option, a long-term evolution technology option, and a certification information option.

7. The portable electronic device of claim 6, further comprising a communication module, wherein the processor is further configured to control the communication module to execute corresponding connection function when receiving a selection signal and determining that the current option is the local area network option, the Bluetooth option, the wireless network option or the long-term evolution technology option.

8. The portable electronic device of claim 6, further comprising:

a button connected to the processor, and configured to be triggered to generate a selection signal, wherein the processor is further configured to enter a menu mode and control the display to display the current option when receiving the selection signal and determining that a current machine mode is not a classification mode.

9. The portable electronic device of claim 1, further comprising a camera module electrically connected to the processor, wherein a lens of the camera module is located on a first side of a casing of the portable electronic device, and the display is located on a second side of the casing, wherein the first side and the second side are next to each other.

10. The portable electronic device of claim 1, wherein the display has a display screen, and the display screen is divided into a plurality of display areas, and the processor is further configured to control the plurality of display areas to display a sequence, name, content information and menu of upper level of the current option, respectively.

11. A user interface operation method, applicable to a portable electronic device including a wheel and a display, comprising:

controlling the display to display a current option, wherein the current option is one of a plurality of first function options and a plurality of second function options;

determining whether the current option belongs to the plurality of first function options or the plurality of second function options, wherein the plurality of first function options correspond to a cycle switching mode, and the plurality of second function options correspond to an endpoint switching mode;

switching the current option to last one of the plurality of first function options when receiving a negative switching signal from the wheel and determining that the current option is first one of the plurality of first function options;

switching the current option to first one of the plurality of first function options when receiving a positive switching signal from the wheel and determining that the current option is last one of the plurality of first function options; and not switching the current option when receiving the negative switching signal and determining that the current option is first one of the plurality of second function options, or when receiving the positive switching signal and determining that the current option is last one of the plurality of second function options.

12. The user interface operation method of claim 11, wherein the plurality of second function options belong to a first main option of the plurality of first function options, and the user interface operation method further comprises:

controlling the display to display one of the plurality of second function options when receiving a selection signal and determining that the current option is the first main option; or wherein the plurality of first function options belong to a second main option of the plurality of second function options, and the user interface operation method further comprises:

controlling the display to display one of the plurality of first function options when receiving the selection signal and determining that the current option is the second main option.

13. The user interface operation method of claim 11, wherein the plurality of second function options belong to a first main option of the plurality of first function options, and the user interface operation method further comprises:

controlling the display to display the first main option when controlling the display displaying one of the plurality of second function options and receiving a selection signal; or wherein the plurality of first function options belong to a second main option of the plurality of second function options, and the user interface operation method further comprises:

controlling the display to display the second main option when controlling the display displaying one of the plurality of first function options and receiving the selection signal.

14. The user interface operation method of claim 11, further comprising:

switching the current option sequentially when receiving the negative switching signal and determining that the current option is one of the plurality of first function options except the first one of the plurality of first function options, or when receiving the positive switching signal and determining that the current option is one of the plurality of first function options except the last one of the plurality of first function options.

15. The user interface operation method of claim 11, further comprising:

switching the current option sequentially when receiving the negative switching signal and determining that the current option is one of the plurality of second function options except the first one of the plurality of second function options, or when receiving the positive switching signal and determining that the current option is one of the plurality of second function options except the last one of the plurality of second function options.

16. The user interface operation method of claim 11, wherein the plurality of second function options correspond to a plurality of volume levels, and the first one of the plurality of volume levels and the last one of the plurality of volume levels correspond to two volume extreme values respectively.

17. The user interface operation method of claim 11, wherein the plurality of second function options comprise at least two of a serial number option, a firmware version information option, a local area network option, a Bluetooth option, a wireless network option, a long-term evolution technology option, and a certification information option.

18. The user interface operation method of claim 17, further comprising:

controlling a communication module to execute corresponding connection function when receiving a selection signal and determining that the current option is the local area network option, the Bluetooth option, the wireless network option or the long-term evolution technology option.

19. The user interface operation method of claim 11, further comprising:

entering a menu mode and control the display to display the current option when receiving a selection signal and determining that a current machine mode is not a classification mode.

20. The user interface operation method of claim 11, further comprising:

controlling a plurality of display areas of the display to display a sequence, name, content information and menu of upper level, of the current option, respectively.

21. The user interface operation method of claim 11, wherein a part of the plurality of second function options is subject to one of the plurality of first function options, and another part of the plurality of second function options is subject to another one of the plurality of first function options.

* * * * *